(No Model.)

J. E. WRIGHT & E. A. GROVER.
FAUCET AND ATTACHMENT THEREFOR.

No. 534,541. Patented Feb. 19, 1895.

WITNESSES:
F. McArdle
H. S. Hutchinson

INVENTORS
E. A. Grover
J. E. Wright
BY Munn & Co
ATTORNEYS.

UNITED STATES PATENT OFFICE.

JOSEPH EARL WRIGHT AND EDWIN A. GROVER, OF SAN ANTONIO, TEXAS.

FAUCET AND ATTACHMENTS THEREFOR.

SPECIFICATION forming part of Letters Patent No. 534,541, dated February 19, 1895.

Application filed June 20, 1894. Serial No. 515,092. (No model.)

*To all whom it may concern:*

Be it known that we, JOSEPH EARL WRIGHT and EDWIN A. GROVER, of San Antonio, in the county of Bexar and State of Texas, have invented a new and Improved Faucet and Attachments Therefor, of which the following is a full, clear, and exact description.

Our invention is an improved faucet, and attachment, for use in drawing beer, or any other liquid with which it is desirable to prevent the contact of air within the keg. The faucet is provided with a sliding attachment, comprising an inflatable air-bag, and a fixed and sliding tube for pushing the bag out of the faucet proper into the keg and subsequently permitting injection of air, and also with valves for regulating the discharge of the contents of the keg. The construction of the device is such that it is cheap and durable, and is adapted to be used in place of the ordinary beer-faucet.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
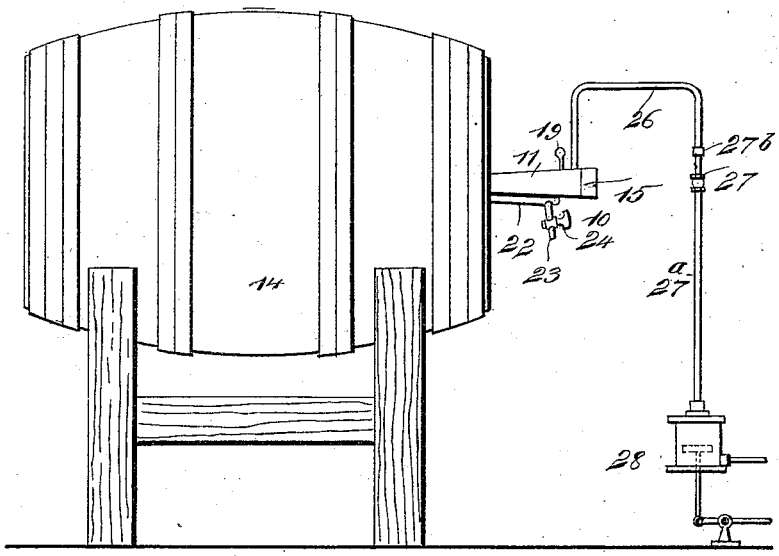
Figure 2:
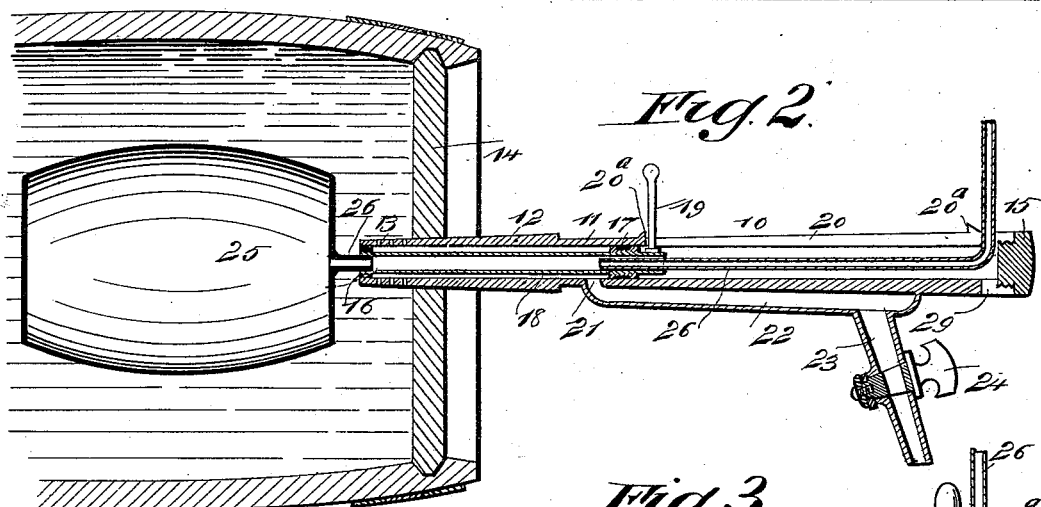
Figure 3:
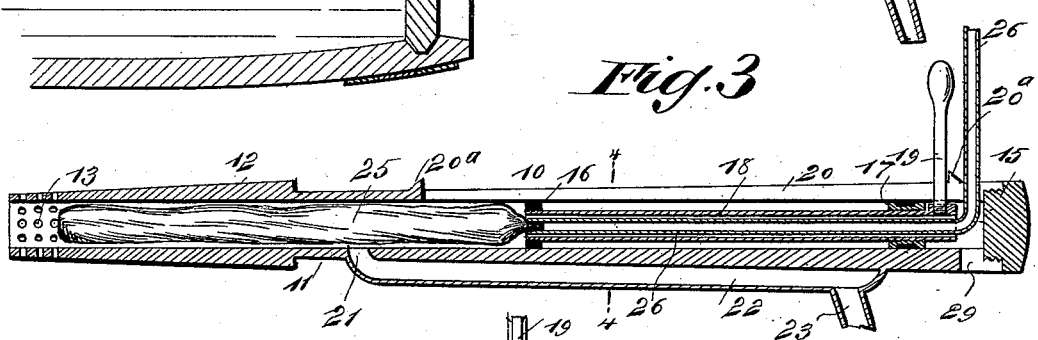
Figure 4:
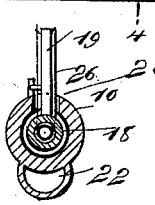

Figure 1 is a side elevation of our improved apparatus as applied to a keg. Fig. 2 is an enlarged longitudinal section of the faucet and attachments as applied to a beer keg, showing the bag partially inflated and the valves in position to permit the outflow of beer. Fig. 3 is a detail longitudinal section of the faucet with the inflatable bag drawn into the body of the faucet; and Fig. 4 is a cross section on the line 4—4 of Fig. 3.

The faucet 10 is provided with an elongated body 11 which is hollow throughout its entire length and is enlarged exteriorly, as shown at 12, which enlargement is tapering to permit the faucet to be conveniently driven into the keg 14, while the inner end of the faucet is provided with side perforations 13 through which the liquid may flow from the keg, as hereinafter described. The outer end of the faucet is closed by a screw cap 15, which may be removed to permit the bag and connections to be pulled out through the faucet, as described below, and when the cap is in place it forms a solid head for the faucet and may be safely struck to drive the faucet into the keg.

The faucet is provided with slide valves 16 and 17 which fit snugly within it and which are connected by a pipe 18 of less diameter than the faucet, the pipe having at its outer end a handle 19 which screws into it so that it may be removed when necessary, and this handle slides in a slot 20 in the faucet, so that by grasping it and moving it back and forth the two valves may be similarly moved.

The movement of the handle and consequently of the valves is limited by the stops 20ª, see Fig. 2, and when the handle is in contact with the inner stop the valve 16 is in position to close the extreme inner end of the faucet, while the valve 17 is just in front of the opening 21, and when the handle is against the outer stop 20ª the valves are pulled to the outer end of the faucet, as shown in Fig. 3, thus drawing the inflatable bag into the faucet. On the under side of the faucet is a channel 22 which connects with the main bore of the faucet, as shown at 21, and this channel delivers into a branch pipe 23 through which the beer is drawn and which is controlled by a cock 24.

The inflatable bag 25 is made of soft rubber so that it may be conveniently drawn into the faucet when it is deflated. A pipe, composed of parts 26 and 27ª, coupled at 27, connects the faucet with an air pump, 28. The upper part or branch, 26, has a check valve, 27ᵇ, and the neck or end portion thereof, which lies fixed in the bore of the faucet proper, fits snugly in the pipe, 18, which slides upon it in the operation of ejecting and drawing in the air-bag. By working the pump, 28, when the bag, 25, is in the beer keg, the bag will be filled so as to give the necessary pressure to the beer and will, at the same time, cool the beer. The bag-neck may be inserted through a hole 29 in the faucet 10 and the cap 15 may be removed to permit the insertion of the bag, the cap being also removed when the bag and valve are to be pulled out.

When the faucet is applied to the keg, the bag 25 and the valves 16 and 17 are within the faucet, as shown in Fig. 3, and after the faucet is driven into the keg, the handle 19, is pushed inward, thus sliding the pipe, 18, and its attached valves, and the bag, 25, in the same direction, so that the bag, 25, enters the keg, and the valve 16 closes the inner end of the faucet and the valve 17 closes the faucet just outside the entrance or opening 21 to the channel 22. The pump 28 is then set in operation, thus forcing air through the pipe 27 and neck 26 to the bag 25, which is inflated sufficiently to give the desired pressure to the beer, and when the cock 24 is opened the beer flows out through the perforations 13, the body of the faucet, the channel 22, and the branch pipe 23.

When the faucet is to be removed, the neck 26 is separated from the pipe 27$^a$ at the coupling 27$^b$ and the bag is thereby instantly deflated, after which the handle 19 is pulled out so as to draw the bag into the faucet, and the faucet may be removed from the keg and driven into another one.

Having thus described our invention, we claim as new and desire to secure by Letters Patent—

1. The combination, with the faucet having an outlet pipe and the side perforations, of the slide valve in the faucet, an inflatable bag held within the faucet, and an outlet neck connecting with the bag and extending outward through the valves and faucet, substantially as described.

2. The combination with the faucet proper, of the air-pipe neck fixed in the bore of the latter, the inflatable bag adapted to be contained in the faucet, and a tube provided with a handle and connected with the bag, and slidable in the faucet upon the aforesaid neck, as shown and described.

3. The combination, with the faucet having a perforated inner end and an outlet channel, of the slide valves connected by a pipe and arranged to close the faucet at its inner end and at a point adjacent to the outlet channel, the inflatable bag adapted to be held within the faucet, and the neck connected with the bag and extending outward through the valves and faucet, substantially as described.

4. The combination, with the faucet having a perforated inner end, the longitudinal slot and the outlet channel, as specified, of the slide valves connected by a pipe and adapted to close the faucet at its inner end and at a point near the outlet channel, the handle connected to the valves and held to slide in the slot of the faucet, and the inflatable bag having a neck extending outward through the valves and faucet, substantially as described.

5. The combination, with the longitudinally slotted faucet having the perforated inner end and the outlet channel, as specified, of the connected slide valves arranged to close the faucet at its inner end and at a point near the outlet channel, a handle connected with the valves and adapted to slide in the slot of the faucet, stops to limit the movement of the handle and valves, and the inflatable bag having a neck extending outward through the valves and faucet, substantially as described.

JOSEPH EARL WRIGHT.
EDWIN A. GROVER.

Witnesses:
RICHARD A. WEBB,
PHIL. L. WRIGHT.